May 17, 1927.
G. BONACCORSE
ANTISKID DEVICE
Original Filed Feb. 28, 1925    2 Sheets-Sheet 1
1,629,432
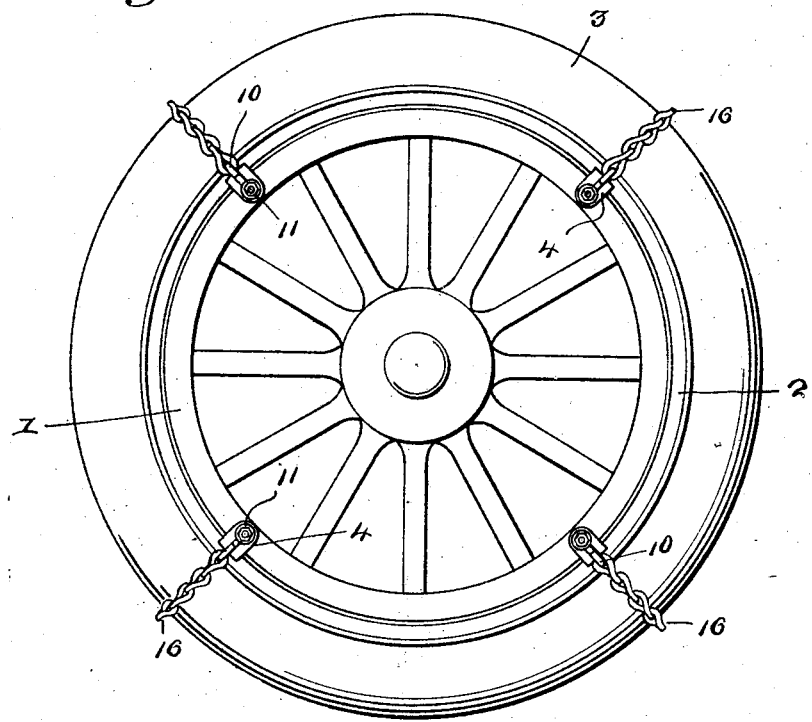
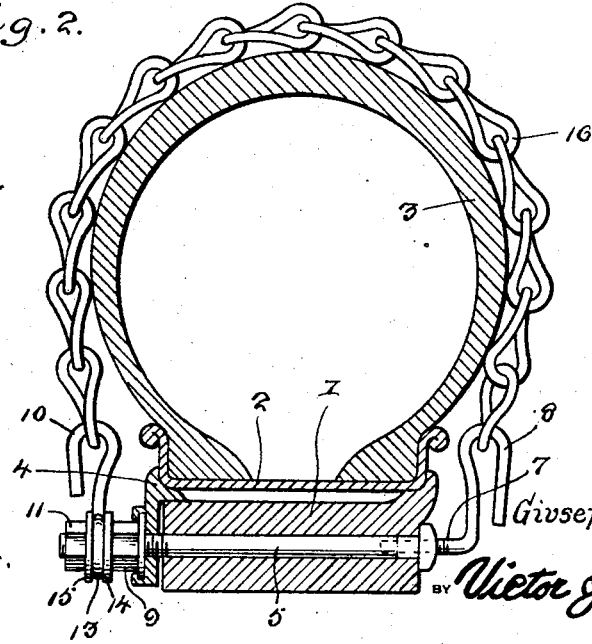
Giuseppe Bonaccorse
INVENTOR May 17, 1927. 1,629,432
G. BONACCORSE
ANTISKID DEVICE
Original Filed Feb. 28, 1925 2 Sheets-Sheet 2
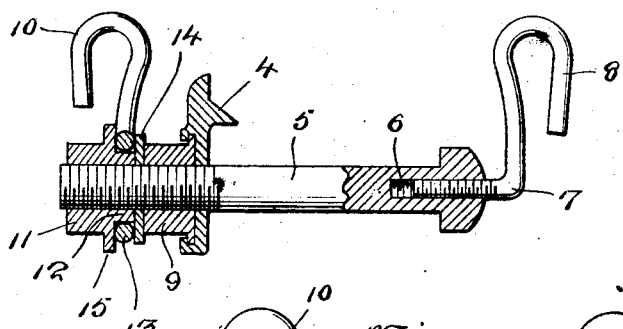
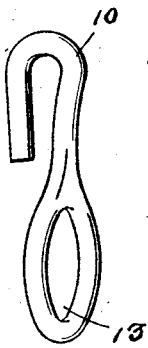
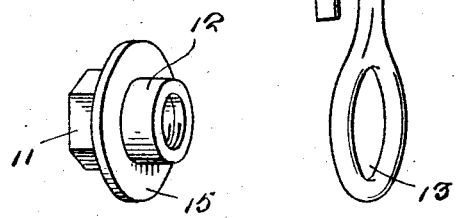
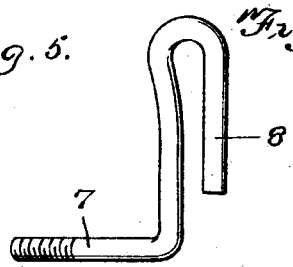
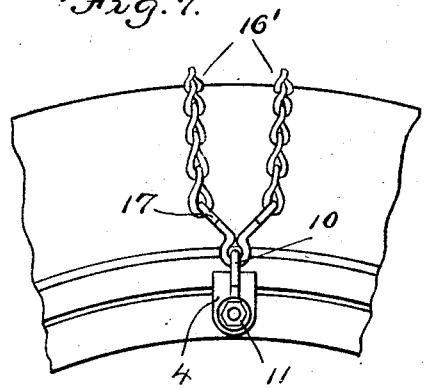
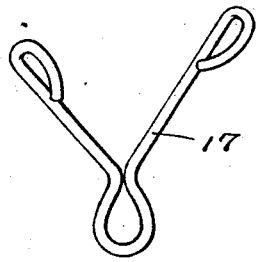
Giuseppe Bonaccorse
INVENTOR
BY Victor J. Evans
ATTORNEY
WITNESS:

Patented May 17, 1927.

UNITED STATES PATENT OFFICE.

GIUSEPPE BONACCORSE, OF LAWRENCE, MASSACHUSETTS.

ANTISKID DEVICE.

Application filed February 28, 1925, Serial No. 12,398. Renewed October 15, 1926.

This invention relates to improvements in anti-skid devices for the wheels of vehicles, the general object of the invention being to provide means whereby chains can be placed across a tire and easily and quickly attached to a part of the wheel.

Another object of the invention is to so form the parts that if a chain should break, the parts thereof would drop off the wheel and thus not damage the fender or other part of the vehicle.

Another object of the invention is to place the bolts which hold the lugs or hooks on the bolts which hold the lugs or other rim retaining means to the wheel, these hooks receiving the ends of the chains which extend across the tire.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings, wherein like characters denote like or corresponding parts throughout the several views, and in which:—

Figure 1 is a view of a wheel showing the invention in use.

Figure 2 is a transverse sectional view through the felly and tire part of the wheel.

Figure 3 is a view partly in section of one of the bolts and its associated parts.

Figure 4 is a view of the hook carrying nut.

Figure 5 is a view of one of the hooks.

Figure 6 is a view of the other hook.

Figure 7 is a view showing a slight modification.

Figure 8 is a view of one of the Y-shaped members used in the modification.

In these views, 1 indicates the felly, 2 the tire rim and 3 the tire. As is well known, lugs 4 are used for holding the rim 2 on the felly, the lugs being held in place by the bolts 5. In carrying out my invention, I make these bolts 5 of considerable length and form a threaded hole 6 in the head end of each bolt so that a threaded shank 7 of a hook member 8 can be attached to this end of each bolt. The lugs 4 are engaged by the usual nuts 9 which are threaded on the bolts 5. The threaded end of each bolt supports a second hook member 10 by means of a nut 11 which has a reduced part 12 on its inner end for receiving an eye 13 of the hook member. The hook member is rotatably supported by the nut as its eye part rests between a washer 14 placed between the nuts 9 and 11, and a flange 15 formed on the nut 11. Each cross chain 16 is attached to the wheel by the hook members 8 and 10 of each bolt and in putting the chains in position, the hook members 10 are removed from the bolts by removing the nuts 11 and then one end of each chain is placed in engagement with the hook 8, the chain passed over the tire and its other end engaged with the hook 10. Then the eye of this hook 10 is placed on the threaded end of the bolt and pushed against the washer 14, after which the nut 11 is placed on the bolt and screwed home so that its reduced part 12 will pass into the eye 13. The hook 10 is thus movably supported on the bolt so that it will adjust itself to the movement of the chain. If a chain should break, the parts thereof would drop off the hooks and not be carried around with the wheel and swung against the fender and damage the same.

From the foregoing, it will be seen that I have provided simple means for holding skid chains on a wheel, such means permitting the chains to be put in place without jacking up the wheel or moving the vehicle and while the drawings show the invention as applied to a wheel which uses lugs for holding the rim in place, it will, of course, be understood that it can be used with other types of rim retaining means.

In the modification, a Y-shaped member 17 is placed in engagement with each hook member and a pair of chains 16' is attached to each pair of Y-shaped members, as shown in Figure 7. With this attachment, a greater number of cross chains can be used than in the first form.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described including a bolt having a central threaded bore, a hook having a shank at right angles thereto and threaded within said bore, a nut threaded upon the end of the bolt opposite the bore, an attaching lug loosely supported thereby, a second nut on the bolt in alignment with the first nut, a washer between said nuts, a reduced part on the inner end of the second nut, a flange on the second nut between the body thereof and the reduced part whereby to form a channel between the washer and said flange and a second hook member formed with an eye adapted to be mounted upon said reduced part.

In testimony whereof I affix my signature.

GIUSEPPE BONACCORSE.